United States Patent [19]
Rajan et al.

[11] Patent Number: 4,898,692
[45] Date of Patent: Feb. 6, 1990

[54] PROCESS FOR DIRECT CONVERSION OF REACTIVE METALS TO GLASS

[75] Inventors: John B. Rajan; Romesh Kumar; Donald R. Vissers, all of Naperville, Ill.

[73] Assignee: The United States of America as represented by the United States Department of Energy, Washington, D.C.

[21] Appl. No.: 271,967

[22] Filed: Nov. 16, 1988

[51] Int. Cl.$^4$ .............................................. G21F 9/16
[52] U.S. Cl. .................................. 252/629; 252/628; 252/632; 432/13; 432/31
[58] Field of Search ................ 252/629, 632; 423/201, 423/2; 501/152, 155; 432/13, 31

[56] References Cited

U.S. PATENT DOCUMENTS

| | | | |
|---|---|---|---|
| 4,009,990 | 3/1977 | Bonniaud et al. | 423/13 |
| 4,028,265 | 6/1977 | Barney et al. | 252/629 |
| 4,234,449 | 11/1980 | Wolson et al. | 252/629 |
| 4,263,163 | 4/1981 | Ross | 252/628 |
| 4,383,944 | 5/1983 | Ondracek | 252/629 |
| 4,389,332 | 6/1983 | Ross | 432/13 |
| 4,424,149 | 1/1984 | Bege et al. | 252/629 |
| 4,457,703 | 7/1984 | Ross | 432/13 |
| 4,487,711 | 12/1984 | Pope et al. | 252/629 |
| 4,496,477 | 1/1985 | Ross | 252/629 |
| 4,501,690 | 2/1985 | Ross | 252/628 |
| 4,579,525 | 4/1986 | Ross | 110/332 |
| 4,592,898 | 6/1986 | Kaufmann | 422/159 |
| 4,643,846 | 2/1987 | Kanai et al. | 252/626 |
| 4,735,784 | 4/1988 | Davis et al. | 423/111 |
| 4,772,431 | 9/1988 | Aubert | 252/629 |

OTHER PUBLICATIONS

DOE/HP-29, ANL-87-39, Rajan et al., "Improved Treatment/-Disposal of Reactive Metals", Annual Report, 10/1987.
ANL-78-87, McPheeters et al., "Disposal of Radioactive Sodium Waste", ANL, dated Sep. 1978.

*Primary Examiner*—Howard J. Locker
*Attorney, Agent, or Firm*—Thomas G. Anderson; James W. Weinberger; William R. Moser

[57] ABSTRACT

Radioactive alkali metal is introduced into a cyclone reactor in droplet form by an aspirating gas. In the cyclone metal reactor the aspirated alkali metal is contacted with silica powder introduced in an air stream to form in one step a glass. The sides of the cyclone reactor are preheated to ensure that the initial glass formed coats the side of the reactor forming a protective coating against the reactants which are maintained in excess of 1000° C. to ensure the formation of glass in a single step.

17 Claims, 1 Drawing Sheet

PROCESS FOR DIRECT CONVERSION OF REACTIVE METALS TO GLASS

CONTRACTUAL ORIGIN OF THE INVENTION

The U.S. Government has its rights in this invention pursuant to Contract No. W-31-109-ENG-38 between the U.S. Department of Energy and Argonne National Laboratory.

BACKGROUND OF THE INVENTION

Operation of liquid-metal-cooled fast breeder reactors results in production of radioactive sodium waste material or radioactive sodium and potassium waste material, depending on the liquid coolant used in the reactor. The sources of this radioactive alkali metal include cold-trap disposal, maintenance operations, and fuel-reloading operations. At the end of the useful life of the plant, the entire alkali metal waste of the plant must be handled in such a way as to minimize its impact on the environment and to minimize cost. Any alkali metal that has been exposed to the breeder reactor core for a significant time must be carefully handled and controlled because of its fission-product and activation-product content. Among the options available for disposal of this radioactive alkali metal, the most promising are: (1) disposal in a permanent repository, (2) disposal in a landfill burial site, and (3) reuse in a new breeder reactor. The choices among these options depend on the activity level, the presence or absence of transuranics, and the quantity of alkali metal involved. The first cited option could be suitable for small quantities of alkali metal containing transuranics; the second cited option is available for small quantities of alkali metal with low level radioactivity but without transuranics; and the third cited option is available for large quantities of alkali metal.

Large quantities of alkali metal that have become contaminated by means of significant fuel-coolant interaction could be reused if the alkali metal were decontaminated. In any decontamination operation, such as reflux distillation, a small volume of highly radioactive contaminated alkali metal remains in the original alkali metal treated. This small quantity of highly radioactive alkali metal could then be disposed of in a permanent repository.

In order to prevent the alkali metal from interacting with the environment, final disposal must be in a form stable to the environment such as certain non-metallic compounds. Various types of glasses containing silica and alkali monoxides may be suitable as the stable form for permanent repository. For example, the composition of ordinary window glass is 17% by weight sodium monoxide, 6% by weight calcium oxide, 1% by weight aluminum oxide with he balance being silica. The volume of this glass made from a given mass of elemental sodium is approximately 3 times the original volume of the sodium metal, but this expansion in volume of waste material is not unacceptable in view of the benefits derived from the product.

While typical or ordinary window glass is not ideal for disposal of radioactive sodium, or radioactive potassium or mixtures of sodium and potassium, from the standpoint of leaching of the fission products by water, other glass compositions are suitable as candidate materials for encapsulation of high-level waste from breeder reactors or for that matter from fuel-reprocessing. These glasses typically contain both silica and sodium or potassium monoxide in various silicon to alkali metal ratios. Additive oxides which may be compounded with the radioactive alkali metal monoxide and the silica generally are selected from the following class of compounds including aluminum, antimony, arsenic, barium, beryllium, boron, calcium, cadmium, germanium, lead, magnesium, phosphorus, silicon, vanadium, zinc and zirconium. However, it has been found that additives selected from the oxides of boron, aluminum, calcium and magnesium are preferred. It has also been found that the use of boron in at least as great a quantity as the sum of the aluminum, calcium and magnesium oxides results in a better leach proof glass.

Representative prior art which relates to the production of glass for the storage of radioactive alkaline waste includes U.S. Pat. No. 4,032,615 issued Jun. 28, 1977 to Johnson, U.S. Pat. No. 4,032,614 issued Jun. 28, 1977 to Lewis, U.S. Pat. No. 4,107,306 issued Apr. 12, 1977 to Batoux et al., U.S. Pat. No. 3,854,933 issued Dec. 17, 1974 to Furakawa et al., and U.S. Pat. No. 2,527,443 issued Oct. 24, 1952 to Padgitt. In addition to the above listed patents, U.S. Pat. No. 4,234,449 issued to Wolson et al., Nov. 18, 1980 also relates to a rotary drum reactor for the two-step production of glass for storing radioactive metal waste, the disclosure of the '449 patent is incorporated herein by reference.

SUMMARY OF THE INVENTION

According to the present invention, radioactive alkali metal is aspirated with a gas such as nitrogen or its equivalent and introduced into a cyclone reactor along with silica carried in a airstream. The cyclone reactor is maintained at a sufficiently high temperature such that the aspirated radioactive alkali metal is converted in a single step to the appropriate glass.

It is a principal object of the present invention to provide a method of handling highly radioactive alkali metal that is low in cost, relatively simple to control, easily adapted to continuous production that produces a product which in and of itself is in a stable disposable form and at the same time provides a minimum release of radioactivity.

An important object of the present invention is to provide a one-step process for converting radioactive metal waste into a product suitable for storage, comprising providing a cyclone reactor having means for heating the side walls thereof and an exhaust gas outlet and a glass product outlet, establishing an inlet stream of aspirated radioactive metal waste, establishing an inlet stream of air and silica, mixing the two inlet streams in the cyclone reactor to produce a glass and an off gas, maintaining the side walls of the reactor at a temperature sufficient to permit the glass formed in the reactor to flow along the side walls to the liquid glass outlet, and continuously venting off gas through the exhaust gas outlet.

Another object of the invention is to provide a one-step process for converting radioactive metal waste into a product suitable for storage, comprising providing a reactor vessel having means for heating the walls thereof and an exhaust gas outlet and a product glass outlet, introducing radioactive alkali metal waste aspirated by nitrogen into the reactor vessel, introducing air and silica into the reactor vessel wherein the silica is present in an amount of about 2.5 times the amount of radioactive metal waste, reacting the silica, air and radioactive metal waste in one step at a temperature in excess of 1000° C. to form a glass, and removing the glass from the reactor vessel.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
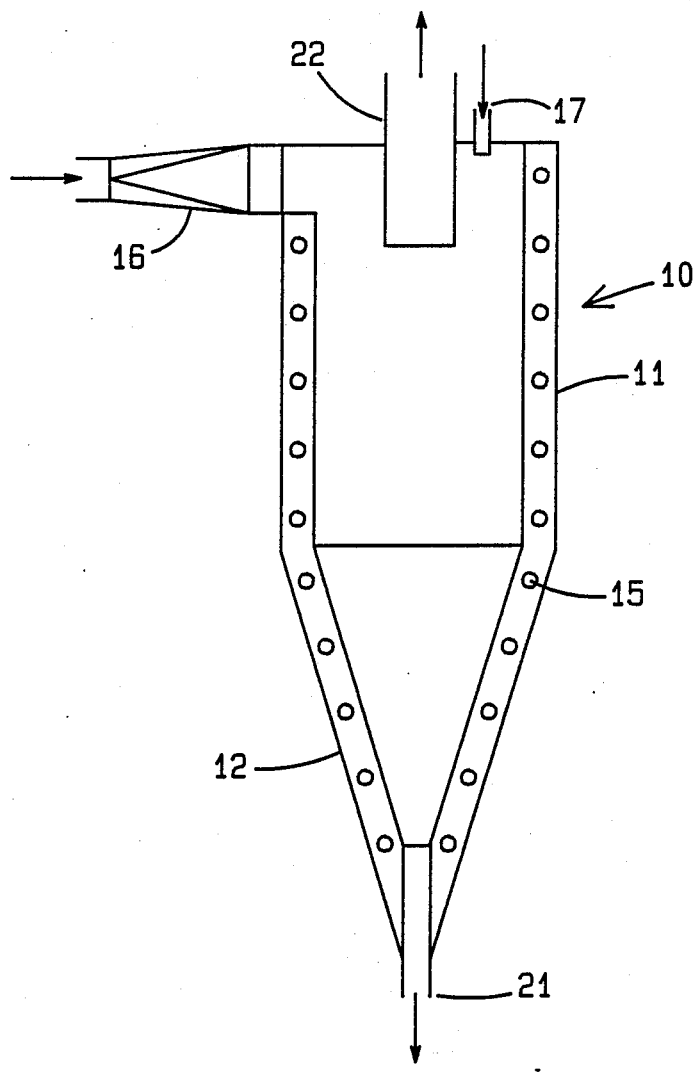
FIG. 1 is a schematic illustration of a cyclone reactor useful in performing the invention.

Referring now to FIG. 1 of the drawing, there is disclosed a cyclone reactor 10, which as is common place, has a cylindrical portion 11 and a conical portion 12. An electrical heater 15 is positioned with the coils thereof in the reactor walls 11, 12 to provide a predetermined temperature to the walls 11, 12 for a reason hereinafter set forth.

An air silica inlet 16 is provided at the top of the reactor 10 in a direction generally perpendicular to the longitudinal axis of the reactor 10 and an alkali metal inlet 17 is provided at the top of the reactor 10 in a direction generally parallel to the longitudinal axis of the reactor. The reactor 10 has a product outlet 21 at the bottom of the reactor and an off gas exhaust vent 22 at the top of the reactor.

As illustrated, air and silica are introduced into the cyclone reactor 10 at a direction generally perpendicular to the longitudinal axis of the reactor through the inlet 16, the silica preferably being fine particulate matter and may be silica flour. Silica flour is particulate material which passes through a 200 mesh screen. Other satisfactory materials include particulate silica that passes through a 100 mesh screen but which does not pass through a 200 mesh screen. Because of the increased surface area present in silica flour, it is preferred. The silica is entrained in the airstream and it is conveyed as illustrated into the reactor 10 through the inlet 16. Sodium or potassium alkali metal which has been contaminated radioactively is introduced in droplet form through the inlet 17. Nitrogen is the preferred aspirating gas and is used to convert the liquid alkali metal to droplet form. As seen, generally the silica will be present in an amount about 2-½ times the amount of the sodium or alkali metal but enough silica is present to react all the metal introduced. It is within the ordinary skill of the art to calculate the amount of silica necessary to convert the alkali metal introduced into the reactor.

Because the reaction is exothermic, the amount of oxygen introduced with the silica controls the reaction temperature inside the reactor 10. As illustrated in the FIGURE, sufficient air is introduced not only to disperse the silica and to prevent it from forming clumps which may preclude the silica from reacting with the metal but to maintain the reactor temperature above 1000° C. preferably about 1200° C.

As seen from the FIGURE, the off gas produced from the reaction is vented through the outlet 22 while the glass produced from the reaction flows downwardly through the outlet 21. Because of the exothermic nature of the reaction and the temperature at which it occurs, it is an important feature of this invention that the glass when it is first formed coats the interior surface of the walls 11, 12 of the reactor 10 thereby protecting same from the effects of temperature and corrosion. In order to permit the glass to flow downwardly, the walls 11, 12 are preheated before the reaction occurs by the electrical coils 15 before the ingredients are introduced to the reactor 10. In general, preheating to a temperature of about 300° C. is sufficient to initiate the glass forming reaction.

Design calculations indicate that the combined sodium oxidation and glass-making reaction process may be self-sufficient in energy requirements, depending on the choice of glass composition. For 2 g-atoms of sodium reacting with ½ mole of oxygen and 2 moles of silica, the overall reaction to form sodium disilicate is exothermic, as stated previously. If sodium and silica are reacted in this ratio with approximately four times the stoichiometric amount of air required for this reaction, process energy calculations show that the adiabatic reaction temperature would be about 1175° C. With additional silica or other oxides in the reactant mixture, the adiabatic reaction temperature would decrease because of the enthalpy required to provide the sensible heat to raise the "inert" oxides to the reaction temperature (the enthalpy of dissolution of these oxides in sodium disilicate is very low). Moreover, if any of the other cations are introduced as carbonates rather than as oxides, the additional energy required to decompose the carbonates would also lower the adiabatic reaction temperature.

While it was stated that the wall temperature of reactor 10 should be about 300° C. as the minimum reaction temperature, a reactor temperature of 1000° C. or higher would be needed to be able to work with the product glass. Such a temperature is obtained in an adiabatic reactor operating with stoichiometric quantities of reactants to produce sodium disilicate with approximately 300% excess air. Small amounts of other reactants can be introduced with a corresponding decrease in excess air to maintain adiabatic reactor operation at temperatures exceeding 1000° C.; however, the excess air may be required for other reasons, namely, the delivery of the solid reactants to the cyclonic reactor.

The cyclone geometry for the process shown in FIG. 1 is similar to conventional low-g, low-pressure drop units. The sodium is delivered to the reactor using a nitrogen aspirated nozzle. Such a sodium delivery system has been used earlier in tests of controlled sodium burning conducted by MSA. The solids are delivered using a pneumatic conveying system. The product glass is tapped from the bottom of the reactor 10 and cast into suitable shapes, e.g., cubical bricks or globular casts to minimize surface-to-volume ratios.

Commercially available pneumatic conveying systems are adequate for delivering the solid reactants to the cyclonic reactor 10. In order to process 100 lb (about 45 kg) of sodium per hour, a powder delivery system with a 2-in. (5-cm) ID pipe is required to provide the needed air velocity of 9200 ft/min (about 47 m/s). A relatively low ratio of 0.86 lb (about 0.39 kg) of solids per pound of air would be needed. A pressure drop of about 1.8 psi (about 12 kPa) will occur in the conveyor system, corresponding to a blower power requirement of about 2.5 hp.

Glasses having as much as 30 percent by weight of alkali metal, such as Na, K or NaK, used as a coolant in breeder reactors are acceptable. The higher the alkali metal weight percent, the greater the leaching. In order to reduce the rate at which the alkali metal leaches from the glass, additives such as, preferably, boron oxide, aluminum oxide, calcium oxide and magnesium oxide are mixed with the $SiO_2$. The amount of the additives may be as much as 10 percent by weight, and preferably the weight of the boron oxide is equal to or exceeds the combined weight of the other oxide additives.

Of particular importance, is the one-step conversion of alkali metal to glass because it is cheaper than the prior art two-step method and it lends itself to a continuous conversion process, as distinguished from the prior art batch processes. The greater the weight percent of alkali metal in the glass, the lower the volume of the glass, which is an advantage for storage purposes; however, the higher weight percent of alkali metal, the greater the rate at which the alkali metal leaches from the glass. This invention, for the first time, permits large quantities of glass to be prepared by a continuous process in one step, that enables a wide variety of additives to be used to enhance the environmental stability of the glass. The use of a cyclone reactor 10 with aspiration of the metal results in complete conversion of the alkali metal in one step, although some $Na_2O$ or $K_2O$ may be included with the glasses formed by the reaction.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A one-step process for converting radioactive metal waste into a product suitable for storage, comprising providing a cyclone reactor having means for heating the side walls thereof and an exhaust gas outlet and a glass product outlet, establishing an inlet stream of aspirated radioactive metal waste, establishing an inlet stream of air and silica, mixing the two inlet streams in the cyclone reactor to produce a glass and an off gas, maintaining the side walls of the reactor at a temperature sufficient to permit the glass formed in the reactor to flow along the side walls to the liquid glass outlet, and continuously venting off gas through the exhaust gas outlet.

2. The process of claim 1, and further including introducing an oxide selected from the group consisting of $B_2O_3$, $Al_2O_3$, MgO, CaO into the cyclone reactor with the silica to form a leach resistant glass.

3. The process of claim 1, wherein the side walls of the reactor are maintained at a predetermined temperature by heating coils connected to a source of heat in heat transfer relationship with the side walls to form a protective coating of glass on the side walls when the reaction begins.

4. The process of claim 3, wherein said heating coils are positioned inside the side walls.

5. The process of claim 3, wherein the radioactive waste includes sodium metal and the glass includes $Na_2Si_2O_5$ and the temperature of the reactor is maintained in excess of about 1000° C.

6. The process of claim 5, wherein the glass formed has up to about 30% by weight of $Na_2O$, at least 10% by weight of a combination of one or more of $B_2O_3$, $Al_2O_3$, CaO and MgO, and the balance $SiO_2$.

7. The process of claim 5, wherein the $Na_2O$ is present in an amount of from about 20% by weight to about 30% by weight, and $B_2O_3$ is present in an amount greater than the combination of $Al_2O_3$, CaO and MgO.

8. The process of claim 5, wherein the radioactive waste includes NaK and the glass includes $Na_2O$ and $K_2O$.

9. The process of claim 8, wherein the glass formed has up to about 30% by weight of a combination of $Na_2O$ and $K_2O$, at least 10% by weight of a combination of one or more of $Ba_2O_3$, $Al_2O_3$, CaO and MgO, and the balance $SiO_2$.

10. The process of claim 8, wherein the $Na_2O$ and $K_2O$ are present in a combined amount of from about 20% by weight to about 30% by weight and $B_2O_3$ is present in an amount greater than the combination of $Al_2O_3$, CaO and MgO.

11. The process of claim 5, wherein the process is continuous.

12. The process of claim 11, wherein the amount of silica introduced per unit of time is not less than about 2.5 times the amount of radioactive metal waste.

13. The process of claim 12, wherein the reaction occurs at substantially atmospheric pressure.

14. A one-step process for converting radioactive metal waste into a product suitable for storage, comprising providing a reactor vessel having means for heating the walls thereof and an exhaust gas outlet and a product glass outlet, introducing radioactive alkali metal waste aspirated by nitrogen into the reactor vessel, introducing air and silica into the reactor vessel wherein the silica is present in an amount of about 2.5 times the amount of radioactive metal in one step at a temperature in excess of 1000° C. to form a glass, and removing the glass from the reactor vessel.

15. The one-step process of claim 14, wherein the glass contains additives selected from the group consisting of the oxides of boron, aluminum, calcium and magnesium.

16. The one-step process of claim 15, wherein the alkali metal is sodium, the additives are present in an amount of up to about 10% by weight and boron oxide is present in a greater amount than other additives.

17. The one-step process of claim 16, wherein the sodium is present in the glass formed in an amount of from about 20% by weight to about 30% by weight.

* * * * *